United States Patent [19]

Austin

[11] 4,359,156

[45] Nov. 16, 1982

[54] BELT CONVEYOR

[76] Inventor: Fred M. Austin, 1040 Arrowsmith, Eugene, Oreg. 97402

[21] Appl. No.: 171,735

[22] Filed: Jul. 24, 1980

[51] Int. Cl.[3] ............................................. B65G 15/60
[52] U.S. Cl. .................................... 198/841; 198/823
[58] Field of Search ............... 198/823, 841, 840, 837, 198/861

[56] References Cited

U.S. PATENT DOCUMENTS

| 2,702,115 | 2/1955 | Cunningham | 198/823 |
| 2,731,138 | 1/1956 | Parisi | 198/823 |
| 3,292,773 | 12/1966 | Keehart | 198/861 |
| 4,215,776 | 8/1980 | Esler | 198/823 |

Primary Examiner—John J. Love
Assistant Examiner—Brian Bond
Attorney, Agent, or Firm—James D. Givnan, Jr.

[57] ABSTRACT

A conveyor with elongate side members with each member being of irregular shape in section. An inclined surface of each side member partially supports an endless conveyor belt with a mid-portion of the belt supported at intervals by fixed conveyor crossmembers. The crossmembers are molded from material having a low coefficient of friction to adequately support the belt and loads thereon while serving to rigidly interconnect the side members of the conveyor. Fastener assemblies extending through the crossmember ends and abutting portions of the side members couple same yet permit convenient crossmember replacement. Drive means powers a conveyor pulley. Top and bottom covers confine airborne dust particles.

4 Claims, 4 Drawing Figures

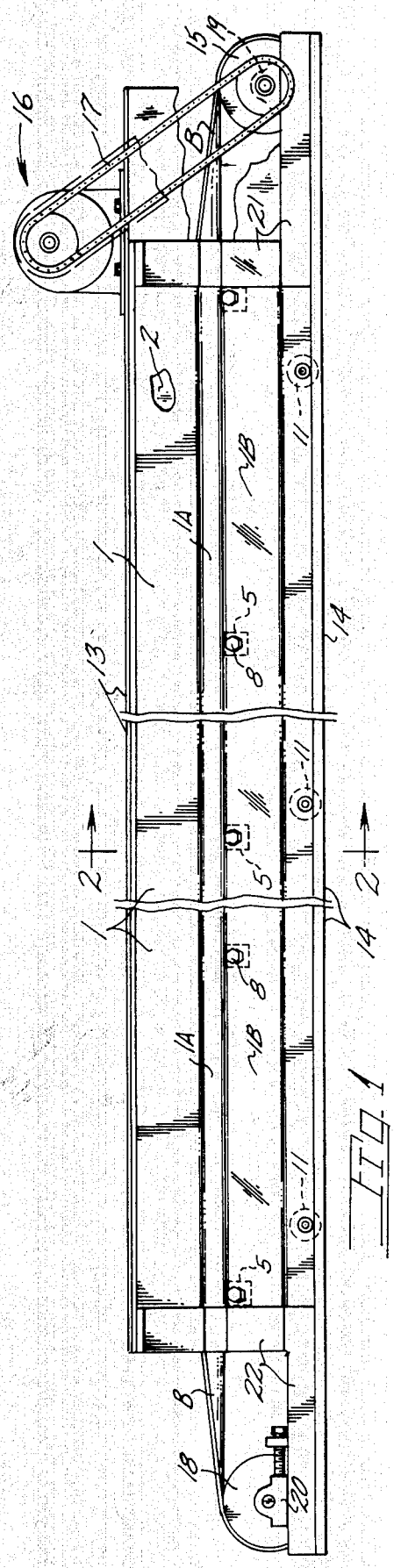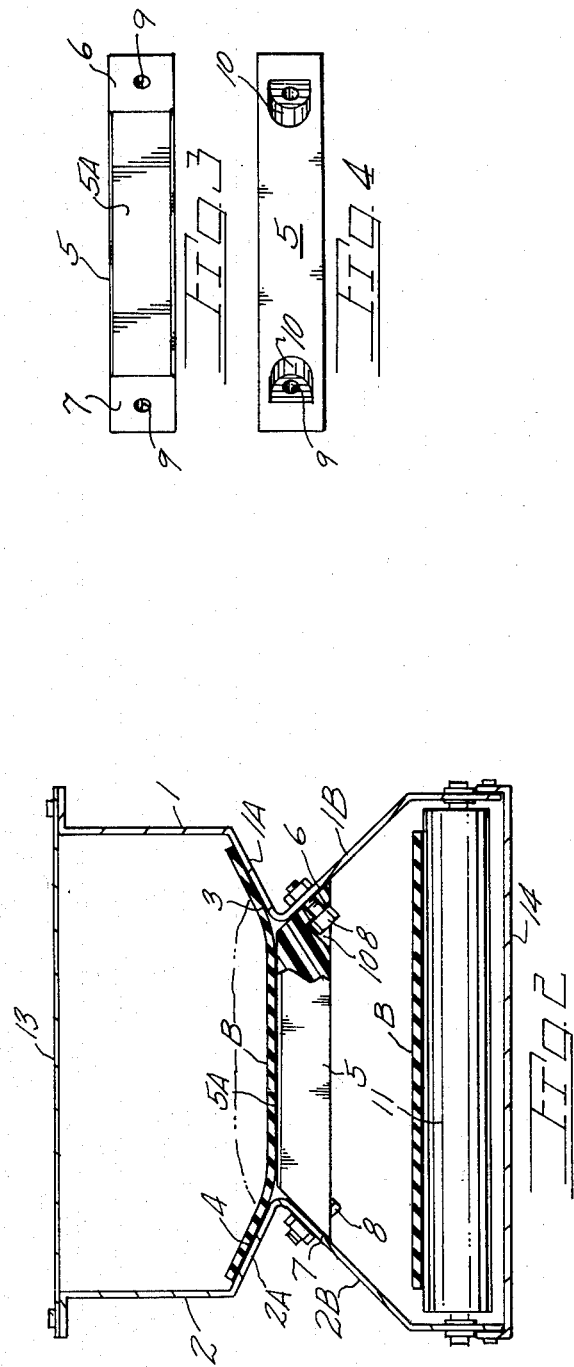

4,359,156

BELT CONVEYOR

BACKGROUND OF THE INVENTION

The present invention concerns belt conveyors and particulary that type of conveyor suitable for conveying lightweight materials.

Typical conveyors include a continuous belt supported at spaced apart points therealong by conveyor rolls. These rolls, as well as additional subjacent idler rolls on which the return run of the belt is supported, require costly bearing supports in place on the conveyor sides. Such conveyors are costly to fabricate and do not lend themselves to convenient disassembly and reassembly nor low cost shipping. Further, the overall weight of typical conveyors is such as to render shipping of same quite costly.

In the prior art, U.S. Pat. No. 2,094,728 shows a conveyor with side members of irregular section with rollers journaled therein which are not structural crossmembers of the conveyor. U.S. Pat. Nos. 3,964,800 and 3,194,388 show conveyor wear plates lengthwise orientated to the conveyor belt; U.S. Pat. No. 3,817,355 shows a belt entrained over a supporting stationary surface; U.S. Pat. No. 3,955,668 discloses a crosswise belt supporting member held in place by oppositely abutting ends of conveyor pan sections. Collectively the known prior art fails to disclose a conveyor particularly suited to low cost shipping and assembly the latter requiring but a minimum of tools and mechanical ability and requiring little or no maintenance.

SUMMARY OF THE PRESENT INVENTION

The present invention is embodied within a conveyor having static crossmembers spaced therealong which jointly serve to support a conveyor belt run while additionally constituting conveyor structural components.

Side members of the present conveyor are of irregular shape in section having upwardly and outwardly inclined portions on which the belt is partially supported. Conveyor crossmembers have uppermost belt supporting surfaces which in conjunction with the aforementioned inclined surfaces fully support the belt across its width with the crossmembers additionally serving to rigidly interconnect the side members of the conveyor. Fastener assemblies extend through the ends of said crossmembers and through the conveyor side members permitting ready assembly or disassembly of the conveyor. Inclined surfaces on the crossmembers abut downwardly and outwardly inclined portions of the side members to provide an extremely rigid structure throughout the conveyor length. The side members may support top and bottom covers to provide further rigidity to the conveyor as well as to confine airborne dust, particulate, etc.

Important objects of the present invention include the provision of a conveyor having crossmembers spaced therealong which are of material having a low coefficient of friction and which support a run of the conveyor belt; the provision of a conveyor having crossmembers spaced therealong which in addition to coupling the conveyor side members to one another support a run of the conveyor belt and which crossmembers are of low original cost and readily replaceable after long periods of use; the provision of a relatively lightweight conveyor having elongate side members of like configuration and lending themselves to nested shipment for low cost shipping; the provision of a conveyor lending itself to receiving top and bottom covers to confine airborne particles.

BRIEF DESCRIPTION OF THE DRAWING

In the drawing:

FIG. 1 is a side elevational view of the present conveyor with sections removed for purposes of illustration;

FIG. 2 is a vertical sectional view along line 2—2 of FIG. 1;

FIG. 3 is a plan view of a conveyor crossmember; and

FIG. 4 is a bottom plan view of FIG. 3.

DETAILED DESCRIPTION OF THE PREFERRED EMBODIMENT

With continuing attention to the drawing wherein reference numerals indicate parts similarly hereinafter indentified, the reference numerals 1 and 2 indicate conveyor side members which are of irregular shape in section each having angular lengthwise portions formed intermediate their upper and lower edges. Each side member has a lengthwise extending angulated portion including an upwardly and outwardly directed segment as at 1B-2B. Such sectional configuration renders the side members suitable for nesting within one another to facilitate compact and economical shipment as are later described components.

A conveyor belt at B rides along the upper surfaces at 3 and 4 of segments 1A and 2A with a medial portion of the belt supported at points therealong by a conveyor crossmember at 5.

In a conveyor embodying the present invention, crossmembers 5 are spaced on approximately three foot centers with the crossmember upper surface at 5A slidably supporting belt B. Surface 5A is chamferred along its edges to avoid excessive belt wear. Each crossmember terminates at inclined end walls 6 and 7 which abut the outwardly and downwardly inclined side member segments 1B and 2B.

Fastener means shown as bolt assemblies 8 extend through crossmember apertures 9 said end walls of the crossmember for securement to the conveyor side members. While other securement provision may be made for the crossmembers, use of removable fastener assemblies permits ready replacement of a crossmember after lengthy use. Recessed areas at 10 receive the bolt heads in a flush manner.

Idler rolls at 11 may be utilized to support the return run of the conveyor belt which rolls may be spaced at much greater intervals than the earlier mentioned crossmembers.

Top and bottom covers at 13 and 14 enclose the conveyor belt to confine dust or particulate from the conveyed material from escaping into the atmosphere. Top and bottom cover securement may be by conventional fastening devices.

With attention to FIG. 1, a head pulley 15 journaled at 19 is powered by conveyor drive means generally at 16 including power transmission means 17 the latter shown as a covered roller chain drive. Other drives are entirely suitable. A tail pulley at 18 is adjustably mounted at the conveyor opposite end on adjustable bearings at 20. Belt transition from curved to flat occurs adjacent each pulley. Conveyor end members at 21 and 22 are formed from somewhat heavier guage metal than the conveyor side members to securely support the head and tail pulleys within their respective bearings with end member 21 additionally supporting the platform mounted drive means 16.

In one embodiment of the invention crossmembers 5 are of polyethylene material which has a suitable low coefficient of friction to minimize friction and provide a lengthy period of conveyor operation before replacement for wear. As earlier noted, the present conveyor is highly suited for low cost manufacture and shipping with few components to greatly simplify assembly at a using site. The side members may be at least partially nested for unassembled shipment. The spacing of crossmembers 5 may be on three or four foot centers for typical conveyor uses with lesser spacing for conveying materials of greater density.

While I have shown but one embodiment of the invention it will be apparent to those skilled in the art that the invention may be embodied still otherwise without departing from the spirit and scope of the invention.

Having thus described the invention, what is desired to be secured under a Letters Patent is.

I claim:

1. A conveyor for light materials comprising,
   an endless belt,
   side members of irregular section each having an upwardly and outwardly inclined surface partially supporting the conveyor belt,
   cross members of a synthetic non-metallic material located at spaced intervals transversely of the conveyor centerline, said cross members terminating in end walls in abutment with said side members, threaded fastener means passing through said cross member end walls and securing said cross members intermediate said side members in a detachable manner, each cross member having an upper surface in supporting sliding contact with the underside of the belt, said cross members additionally serving as structural members joining said side members in a rigid spaced apart manner,
   pulleys about which the belt is reversed providing upper and lower belt runs, one of said pulleys being a motor driven pulley, and
   additional belt supporting means extending transversely of the conveyor and at spaced intervals therealong to support the remaining run of the conveyor belt.

2. The conveyor claimed in claim 1 wherein the fastener means are removable bolt assemblies.

3. The conveyor claimed in claim 2 wherein said side members each have outwardly and downwardly extending surfaces for abutment with said crossmember end walls, said bolt assemblies extending through said end walls and the last mentioned surfaces.

4. The conveyor claimed in claim 3 wherein said side members are of identical configuration, top and bottom covers secured to the upper and lower extremities of said side members to provide a closed conveyor open only at its ends.

* * * * *